United States Patent [19]

Cluniat et al.

[11] 4,414,568
[45] Nov. 8, 1983

[54] DEVICE FOR THE MEASUREMENT, IN OPERATION, OF NON-LINEARITY PRODUCTS IN A TELEVISION TRANSMITTER

[75] Inventors: Claude Cluniat; Mariano Dominguez, both of Paris, France

[73] Assignee: L.G.T. Laboratoire General des Telecommuniqations, France

[21] Appl. No.: 217,458

[22] Filed: Dec. 17, 1980

[30] Foreign Application Priority Data

Dec. 21, 1979 [FR] France .................. 79 31488

[51] Int. Cl.³ .................. H04N 7/62; H04N 9/62
[52] U.S. Cl. .................. 358/139; 358/10; 455/9; 455/115
[58] Field of Search .......... 358/139, 10; 455/9, 455/115

[56] References Cited

U.S. PATENT DOCUMENTS

| 2,646,461 | 7/1981 | Grace . | |
| 3,730,984 | 5/1973 | Smith | 358/139 |
| 3,735,039 | 5/1973 | Trzyma | 358/139 |
| 3,867,010 | 8/1979 | Rzeszewski . | |
| 4,215,367 | 7/1980 | Schaffer et al. | 358/139 |
| 4,276,564 | 6/1981 | Watson et al. | 358/139 |

FOREIGN PATENT DOCUMENTS 2413367 3/1974 Fed. Rep. of Germany .
2301133 9/1976 France .
2408959 6/1979 France .

OTHER PUBLICATIONS

J. Irmer; Combined Amplifier Technique for Vision and Sound in Medium Power Television Transmitter, Electrical Communication-vol. 47-No. 3-1972.
Binns, "Measuring Techniques for UHF Television Transmitters Employing Klystrons", The Radio and Electronic Engineer, vol. 41, No. 7, Jul. 1977, pp. 309–314.
Dambacher et al., "Fernsehmesstechnik mit Prüfzeilensignalen", Funkschau, vol. 46, No. 8, Apr. 1974, pp. 784–790.

*Primary Examiner*—John C. Martin
*Assistant Examiner*—Edward L. Coles

[57] ABSTRACT

The present invention relates to a device for measuring in operation the non-linearity of equipment for the transmission of composite television signals. It comprises a processing circuit which samples an intermodulation product located outside the useful spectrum transmitted, but within the band of the equipment generating it, whose measurement is validated by a control circuit for predetermined instantaneous or average values of the vision carrier.

6 Claims, 3 Drawing Figures

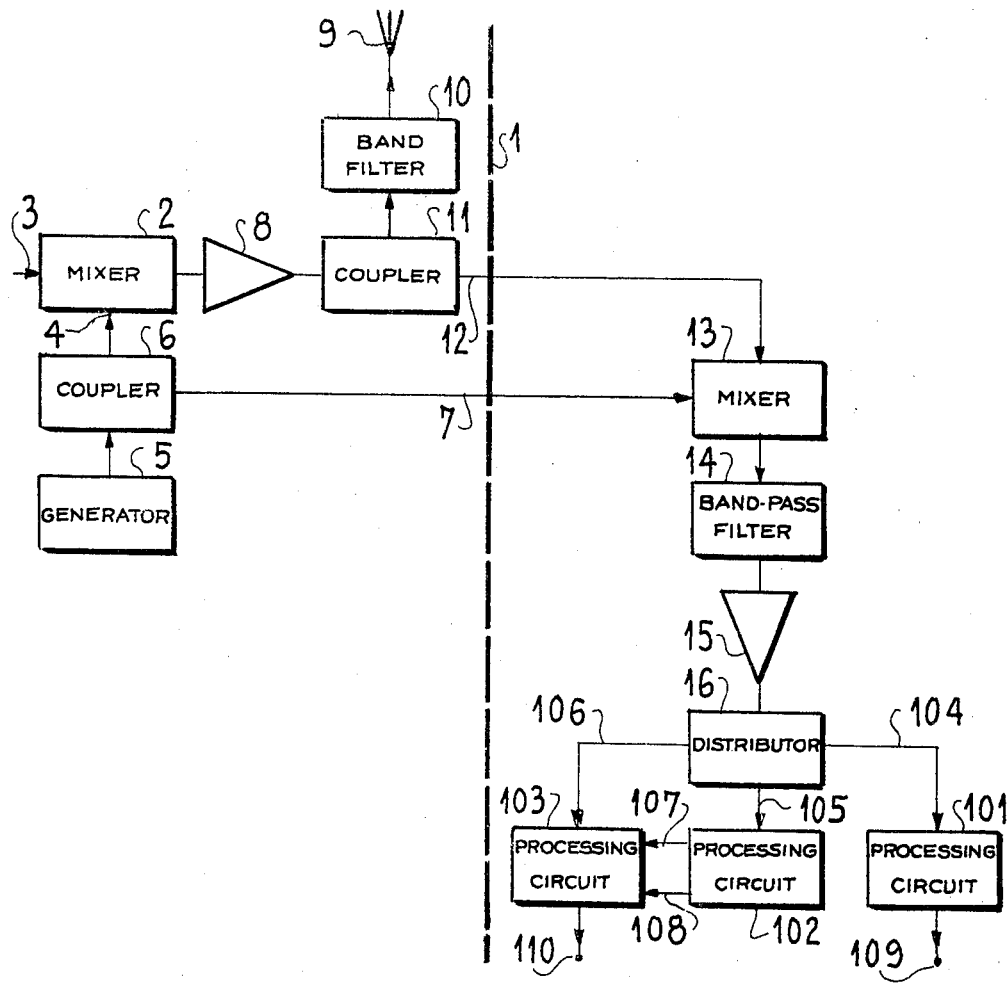
FIG_1
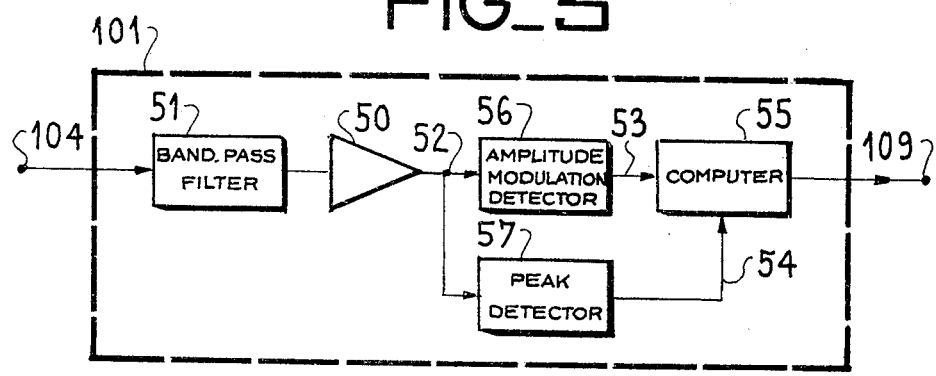
FIG_3

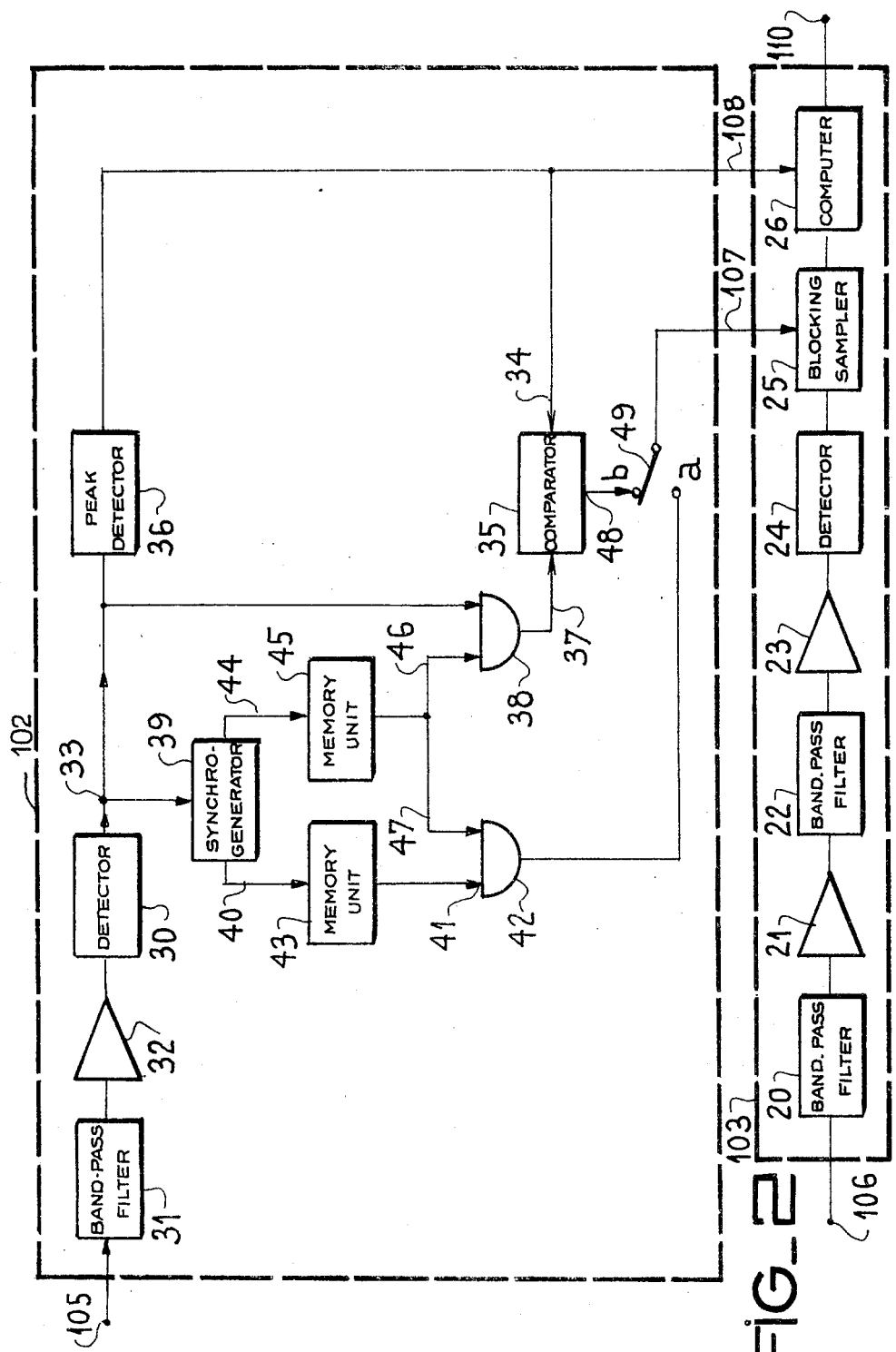
FIG_2

DEVICE FOR THE MEASUREMENT, IN OPERATION, OF NON-LINEARITY PRODUCTS IN A TELEVISION TRANSMITTER

BACKGROUND OF THE INVENTION

The present invention relates to devices for measuring, in operation, the non-linearity product levels in equipment for the transmission and/or retransmission of television signals and, in particular, the power stages for such equipment.

The non-linearity of equipment in general seriously deteriorates the quality of the transmitted signals, particularly when the equipment transmits several carriers, one of which is amplitude-modulated in a wide band, as is the case in television.

As a result of this non-linearity interference frequencies are produced as a result of the beat of the initial frequencies and/or their harmonics, which is generally called intermodulation, and there is an amplitude modulation of each initial frequency, the value of said amplitude being a function of the amplitude of the other frequencies constituting cross modulation.

Outside the operating periods many devices and instruments exist enabling technicians to maintain and regulate the equipment so as to reduce such phenomena and make them compatible with the quality needed for the transmitted signals. However, it is often desirable to monitor the transmission quality during operation.

For this purpose it is known to use test signals included in one of the lines of the field blanking moments for the duration of which an intermodulation measurement is performed in the band transmitted, for example, at the frequency $F_I+F_S-F_{BL}$ in which $F_I$ and $F_S$ are vision and sound carrier frequencies and $F_{BL}$ the frequency of a side band. This measurement represents an artificial, fixed state of the equipment load and in particular is not always available. In fact in certain countries there is no signal at the test frequency.

BRIEF SUMMARY OF THE INVENTION

The present invention relates to a device for the measurement, in operation, of the level of the non-linearity products.

The present invention therefore specifically relates to a device for measuring, in operation, the level of non-linearity products generated in transmission and/or retransmission equipment of television signals, whose transmitters comprise a final power amplification stage followed by a band filter, wherein it comprises:

a circuit for sampling the signal amplified by this stage inserted upstream of the band filter, a first circuit for processing the sampled signal incorporating a control input, a selective amplifier and a frequency spectrum detector of an intermodulation product of the third order outside the useful amplified signal spectrum band, said circuit supplying an amplitude signal proportional to the selected intermodulation product level, a second processing signal incorporating a filter and a circuit for detecting the video frequency signal included in the sampled signal and a control circuit, whose output is coupled to the said control input and which supplies an output signal during moments corresponding to at least one predetermined level of the video frequency signal.

BRIEF DESCRIPTION OF THE DRAWINGS

The invention is described in greater detail hereinafter relative to the non-limitative embodiments and with reference to the attached drawings, wherein show:

FIG. 1 a general circuit diagram of a measuring device according to the invention associated with the terminal stages of a transmitter or rebroadcasting transmitter of television signals.

FIGS. 2 and 3 diagrams of exemplified embodiments of certain members shown in FIG. 1.

DETAILED DESCRIPTION OF THE PREFERRED EMBODIMENTS

To the left of the broken line 1 in FIG. 1 are shown conventional terminal transmission stages constituted by a mixer 2 receiving at its input 3 intermediate frequency signals modulated by a composite television signal and at its input 4 the output signal of a local oscillation generator 5 across a coupler 6 added to the conventional stages in order to divert a small part of the signal of said generator 5 at an output 7.

The output of mixer 2 is connected to a power amplifier 8 supplying a transmitting antenna 9 across a band filter 10. A coupler 11 is inserted between the band filter 10 and the amplifier 8 in order to divert part of the amplified signal to an output 12.

In this embodiment it is assumed that the signal transmitted in these conventional stages comprises a vision carrier of frequency $F_I$ negatively modulated in amplitude, a sound carrier of frequency $F_S$, which is frequency-modulated and a chrominance subcarrier $F_C$, which is only a special case of side bands $F_B$ due to the amplitude-modulation of $F_I$, said frequencies being such that $F_I < F_B < F_S$ and only the non-attenuated side band is considered.

The measuring device according to the invention comprises a mixer 13, whose two inputs are respectively conneced to the outputs 7 and 12.

The output of mixer 13 is connected to the input of a distributor 16 across a band-pass filter 14 followed by an amplifier 15.

Distributor 16 has three outputs 104 to 106 respectively connected to the signal inputs of three processing circuits. Circuit 101 supplies a cross modulation signal at its output 109, circuit 102 supplies the information necessary for the final circuit 103 at its outputs 107 and 108 and at its output 110 circuit 103 supplies an intermodulation signal.

This intermodulation, which it is known to measure from the product of the third order $F_I-F_B+F_S$ in the useful band transmitted and generated either by means of test signals transmitted during field blanking moments or from three generators, is in this case measured from another product of the third order outside the useful band and chosen, for example, equal to $2F_I-F_S$, spaced from the vision carrier by $F_S-F_I$.

Such a product is sufficiently remote from the useful spectrum to be filtered in intermediate frequency by any processing undergone by the signal upstream of the power amplifier 8, as well as by a filter such as 10 in the preceding equipment. However, it is sufficiently close thereto to ensure that it is not attenuated at the output with respect to the useful signal, even if the amplifier 8 is equipped with tubes and consequently loaded by a selective circuit.

It will be shown that the measurement of the level of said product makes it possible to obtain a proportional value, in a given ratio, with that of the hitherto used product $F_I - F_B + F_S$.

$K_3 U^3$ is the general term of the third order of the transfer characteristic of a non-linear device in which $K_3$ is a complex constant characterizing the non-linearity in the considered order and U is the composite input signal given by $$U = I \cos i + B \cos b + S \cos s$$

in which I, B, S are respectively the amplitudes and i, b, s are the instantaneous phases of the carriers $F_I$, $F_B$ and $F_S$.

The complete development of the calculation provides nine components of the same frequency as the input frequency. Six of them have an amplitude which is a function of the square of that of one of the two others. There are three harmonic components of the third order and sixteen of different frequencies among which $$P_B = 3/2 \; K_3 \; I \; B \; S \cos(i - b + s)$$

which represents the produce level in the band, as used in accordance with the method of the three generators $(F_I - F_B + F_S)$ and $P_H = \frac{3}{4} K_3 I^2 S \cos(2i - s)$ which represents the out-of-band product level $(2F_I - F_S)$. This gives $$P_H/P_B = \frac{1}{2} I/B$$

Or in decibels $$P_B = P_H + 6 + B - I \quad (1)$$

Thus, the intermodulation in the band is well established as a function of the levels of the vision carrier of the side band in question and of the value of $P_H$, which is independent of the side bands and in particular the chrominance subcarrier.

Therefore the band-pass filter 14 must transmit a spectrum extending from that of $P_H$ to that of $F_S$.

Circuit 103 selectively amplifies the spectrum of product $P_H$. It is controlled at its input 107 by circuit 102 in order to take account of the value of $P_H$ at moments corresponding to clearly defined values of the carrier I. Circuit 102 also supplies to the input 108 thereof the peak value of the video frequency signal used as a reference for calculating the level of $P_H$ in decibels.

If the control time of taking account of $P_H$ is chosen when I is at 8 dB below the signal peak and taking B = 17 dB equation (1) becomes $$P_B = P_H - 3$$

The measured level $P_H$ must therefore be reduced by 3 dB to reproduce the conventional measurement with three generators.

In the same way by choosing the time when I = 2.5 dB, corresponding to absolute black (field blanking moments), in the case of B = −17 dB we would obtain $$P_B = P_H - 8.5.$$

FIG. 2 shows an exemplified embodiment of circuits 102 and 103. The same reference numerals are used for the same members as in FIG. 1. Input 106 of circuit 103 is connected to output 110 across the following series-connected members: a first band-pass filter 20, a first amplifier 21, a second band-pass filter 22, a second amplifier 23, a detector 24, a blocking sampler 25 with a control input connected to the output 107 of circuit 102 and a computer 26 or measuring circuit with an auxiliary input connected to its output 108.

The input 105 of circuit 102 is connected across a band-pass filter 31, followed by an amplifier 32, to a detector 30, whose output 33 is connected on the one hand across a peak detector 36 to the output terminal 108 and to a first input 34 of a comparator 35 and on the other hand to a second input 37 of comparator 35 across an AND-gate 38, as well as to the input of a synchronizing bit generator 39. A first input 40 of the latter is connected to a first input 41 of an AND-gate 42 across a first memory unit 43. A second output 44 is connected across a second memory unit 45 to a second input 46 of the gate 38 and to a second input 47 of gate 42.

Finally output 107 of circuit 102 is connected either to the output 48 of comparator 35 across position b of switch 49 or to the output of the AND-gate 42 across its position a.

The input terminal 105 receives a complete spectrum filtered by filter 14 (FIG. 1), which is limited by means of filter 31 to the spectrum of the vision carrier, whose amplitude modulation is detected by detector 30 to supply the video frequency signal at its output 33. From the latter is obtained on the one hand by means of detector 36 the peak level of said signal and on the other hand by means of generator 39 the line and field synchronization bits on its respective outputs 40 and 44.

The memory unit 45 comprises two monostable flip-flops in series, the first being raised by the leading front of the line synchronizing bit and drops again at the end of a time constant which slightly exceeds the duration of said bit. Its drop raises the second flip-flop, which is kept in this position until a few moments before the arrival of the next bit. Thus, the putting into operation of said flip-flop characterizes the moments during which the line bits are absent and are characterized by a logic "1".

In the same way memory unit 43 comprises two monostable flip-flops in series. However, the first is raised by the leading front of the field synchronization bit and drops again at the end of a time constant which slightly exceeds the duration of this bit. Its drop raises the second flip-flop, which is kept in this position until the end of the field blanking period. The putting into operation of this flip-flop is characterized by a logic "1".

Thus, the output of gate 42 supplies a logic "1" during field blanking moments which do not coincide with the line synchronization bit. Gate 38 supplies the video frequency signal to the input 37 of comparator 35 when said bits are absent in order not to disturb the operation of the comparator which supplies a logic "1" at its output 48 at all times when the video frequency signal level is identical, to within a tolerance of approximately ±1 dB, to a level of 8 dB below that of the peak level applied to its input 34.

It is known to construct comparators having a sufficiently high speed to enable this comparison to be carried out in instantaneous value, even when the vision carrier is modulated at the highest frequency.

However, experience has shown that this instantaneous comparison is only necessary for video frequency signals modulating the vision carrier in double band amplitude modulation, i.e. up to modulation frequencies of at the most 1.5 or 2 MHz. Beyond this and for a same modulation level single side band modulation leads to a half swing of the carrier level and the mean value comparison is found to be completely significant, making it possible to simplify the construction of the comparator.

Thus, at the output terminal 107 there is a control signal characteristic for position a of switch 49 of field blanking moments, i.e. a video frequency level corresponding to absolute black to which corresponds approximately 2.5 dB below the peak level of the modulated signal or for position b moments where the instantaneous level or average level of the modulated signal is approximately 8 dB below the peak value.

This control signal is used by circuit 103, which receives the same signal as circuit 102, but whose band filters 20 and 22 are centred on the intermodulation product $P_H = 2 F_I - F_S$.

Filtering has been subdivided due to the low level to be used. The main function of the first filter 20 is to prevent any interfering intermodulation on the part of amplifier 21. The second filter 22 eliminates the out-of-band noise which it generates. The band width of these filters is substantially equal to that of the double band modulation spectrum of the intermodulation product.

The amplitude of $P_H$ is obtained by detector 24, which performs an instantaneous detection, at least for the modulation components which modulate the carrier $F_I$ in double band. It is taken into account at given times by the blocking sampler 25, which maintains its value until the next sampling operation in order to evaluate therefrom by means of computer 26 the decibel level compared with the peak level of the video signal received at its input 108.

These moments can be selected by means of switch 49 ensuring the video signal sampling levels, at stated hereinbefore.

The measuring device described hereinbefore also comprises the processing circuit 101 for cross modulation measurement and an embodiment thereof is given in FIG. 3. In FIG. 3 the input terminal 104 is connected to the input of an amplifier 50 across a band-pass filter 51. The output 52 of amplifier 50 is connected to the two inputs 53 and 54 of a computer 55 or measuring circuit across respectively an amplitude modulation detector 56 and a peak detector 57.

Filter 51 has a band width limited to the spectrum of the sound carrier and its frequency modulation side bands.

Computer 55 which is readily fabricated on an analog divider circuit, determines the amplitude modulation percentage of the sound carrier compared with the carrier peak level.

This measurement which is obviously only possible with the presently described method in the case of a frequency-modulated sound carrier is not indispensable for arriving at the sought objective, i.e. the permanent knowledge of the linearity of local connecting equipment because, for a given piece of equipment, the cross modulation and intermodulation vary equally as a function of the characteristics of the same transfer curve.

However, by construction, the cross modulation measurement is a resulting quantity of distortions introduced into the connecting system upstream of the measurement, whereas the intermodulation measurement only relates to the local equipment.

Thus, the operator can obtain additional interesting information therefrom. For example if the intermodulation level is maintained at a normal value, but the cross modulation level increases in time, he will be able to deduce that the general quality of the connection is deteriorating, but that in all probability his equipment is not responsible.

Obviously the constructions described hereinbefore are only of an exemplified nature and many other variants are possible.

For example the function of the processing circuit 102 can be carried out on the basis of delay lines instead of gates and monostable flip-flops, and other reference values for video frequency levels can be adopted. In the same way the considered out-of-band intermodulation product can differ and can in particular be equal to $2F_S - F_I$.

What is claimed is:

1. In an equipment for transmission and/or retransmission of television signals comprising a final power amplification stage having a modulated intermediate frequency information signal input, a local oscillation signal input and an output coupled to a transmission antenna through a band filter,
    a device for measuring in operation, level of non linearity products generated in said equipment comprising:
    a mixer having two inputs respectively coupled to said output and to a said local oscillation signal input of said power stage, and an output,
    a first processing circuit having a signal input coupled to the output of the mixer, a control input and an output, said first circuit comprising a first band-pass filter for selecting an intermodulation product outside the frequency band of the information signal having an output, said first circuit comprising a first band-pass filter for selecting an intermodulation product outside the frequency band of the information signal having an output, a first detector having an input coupled to the output of said band-pass filter and an output, a sampling circuit having a signal input coupled to the output of the first detector and a control input which is the control input of said first circuit, and an output for supplying a signal having an amplitude proportional to the selected intermodulation product, and a measuring circuit having an input coupled to the output of said sampling circuit and an output which is the output of said first circuit for supplying corresponding intermodulation measure,
    and a second processing circuit having an input also coupled to the output of the mixer and an output coupled to the control input of said first circuit comprising a second band-pass filter for selecting video frequency signal having an output, a second detector having an input coupled to the output of said second filter and an output and a control circuit having an input coupled to the output of said second detector and an output which is the output of said second circuit, for supplying a control signal during moments corresponding to at least one predetermined level of the video frequency signal.

2. In an equipment for transmission and/or re-transmission of television signals, a measuring device according to claim 1, wherein the second processing circuit further comprises a peak detector having an input coupled to the output of said second detector and an output, said control circuit comprising an extracting circuit having an input coupled to the output of said second detector, and a first and a second output for respectively supplying field and line synchronization pulses from said video frequency signal, and a comparator having a first input coupled to the output of the peak detector supplying a reference signal, and a second input coupled to the second output of said extracting circuit, a first predetermined level being level of field blanking intervals, and a second predetermined level being the average level of the reference signal.

3. In an equipment for transmission and/or retransmission of television signals, a measuring device according to claim 2, wherein said measuring circuit has a further input coupled to the output of said peak detector of said second processing circuit, said measuring circuit supplying a measure equal to the attenuation value of the selected intermodulation product compared with the video frequency signal peak value.

4. A measuring device according to claim 2, wherein said first band-pass filter is tuned to the intermodulation product having a frequency equal to $2F_I-F_S$ or $2F_S-F_I$, in which $F_I$ and $F_S$ are respectively picture and sound carrier frequencies of the transmitted television signals.

5. In an equipment for transmission and/or retransmission of television signals comprising a carrier frequency-modulated by audio frequency signals, a measuring device according to claim 1, further comprising a third processing circuit having an input coupled to the output of the mixer, said third circuit comprising a selective amplifier of the modulated carrier spectrum, having an input which is the input of said third circuit and an output, an audio carrier peak detector and an amplitude modulation detector having respective inputs connected to the output of the selective amplifier and respective outputs, and a second measuring circuit having two inputs coupled to the outputs of said carrier peak detector and of said amplitude modulation detector for supplying the amplitude modulation percentage of the modulated carrier.

6. In an equipment for transmission and/or retransmission of television signals comprising a final power amplification stage having a modulated intermediate frequency information signal input, a local oscillation signal input and an output coupled to a transmission antenna through a band-filter,
 a device for measuring in operation, level of non linearity products generated in said equipment comprising:
 a mixer having two inputs respectively coupled to said output and to said local oscillation signal input of said power stage, and an output,
 first detection means coupled to the output of said mixer for detecting the presence of intermodulation products falling within a first predetermined spectral region outside the spectral band of the television signal;
 second detection means coupled to the output of said mixer for detecting the presence of intermodulation products falling within a second predetermined spectral region outside the spectral band of the television signal;
 said first detection means including means for extracting television synchronization data;
 means for sampling a detected signal of said second detection means in response to said synchronization data of said first detection means; and
 level means coupled to an output of said sampling means for establishing a level of the intermodulation product of said second detection means as reference to a value of the intermodulation product of said first detection means.

* * * * *